United States Patent
Walden et al.

(10) Patent No.: US 10,382,215 B2
(45) Date of Patent: Aug. 13, 2019

(54) DEVICE IDENTIFICATION AND POLICY ENFORCEMENT USING POWER OVER ETHERNET (POE)

(71) Applicant: ForeScout Technologies, Inc., Campbell, CA (US)

(72) Inventors: Gilad Walden, Tel-Aviv (IL); Tomer Reisner, Rehovot (IL); Kevin Mayer, Tel-Aviv (IL); Svetlana Khanin, Tel-Aviv (IL)

(73) Assignee: FORESCOUT TECHNOLOGIES, INC., San Jose, CA (US)

( * ) Notice: Subject to any disclaimer, the term of this patent is extended or adjusted under 35 U.S.C. 154(b) by 284 days.

(21) Appl. No.: 15/073,650

(22) Filed: Mar. 18, 2016

(65) Prior Publication Data

US 2017/0180141 A1  Jun. 22, 2017

Related U.S. Application Data

(60) Provisional application No. 62/271,068, filed on Dec. 22, 2015.

(51) Int. Cl.

| | |
|---|---|
| *G06F 15/173* | (2006.01) |
| *H04L 12/10* | (2006.01) |
| *H04B 17/10* | (2015.01) |
| *H04L 12/24* | (2006.01) |
| *H04L 12/40* | (2006.01) |
| *H04L 12/26* | (2006.01) |
| *H04L 29/06* | (2006.01) |

(52) U.S. Cl.
CPC .......... *H04L 12/10* (2013.01); *H04B 17/104* (2015.01); *H04L 12/40045* (2013.01); *H04L 41/0213* (2013.01); *H04L 41/0893* (2013.01); *H04L 41/28* (2013.01); *H04L 43/04* (2013.01); *H04L 43/0876* (2013.01); *H04L 63/1408* (2013.01); *H04L 43/08* (2013.01); *Y04S 40/168* (2013.01)

(58) Field of Classification Search
CPC ... H04B 17/104; H04L 41/0213; H04L 12/10; H04L 41/28; H04L 41/0893; H04L 63/1408; H04L 43/0876; H04L 43/04; H04L 12/40045; H04L 43/08; Y04S 40/168
USPC ...... 709/224; 370/328, 352, 338; 726/23, 25
See application file for complete search history.

(56) References Cited

U.S. PATENT DOCUMENTS

| | | | |
|---|---|---|---|
| 2004/0073597 A1 | 4/2004 | Caveney et al. | |
| 2006/0039316 A1* | 2/2006 | Ogushi | H04W 8/26 370/328 |
| 2007/0086436 A1* | 4/2007 | Denny | H04L 29/06027 370/352 |

(Continued)

OTHER PUBLICATIONS

Transmittal of The International Search Report and Written Opinion of the International Searching Authority for PCT/US2016/064462, filed Dec. 1, 2016, 14 pages.

*Primary Examiner* — Thuong Nguyen
(74) *Attorney, Agent, or Firm* — Womble Bond Dickinson (US) LLP; Daniel E. Ovanezian

(57) ABSTRACT

Systems, methods, and related technologies for device identification and policy enforcement using Power over Ethernet (PoE) are described. In certain aspects, a communication that originates from a Power over Ethernet (PoE) enabled device can be received. The communication can be processed to determine a characteristic of the device. An action can be initiated based on the characteristic.

8 Claims, 5 Drawing Sheets

(56) References Cited

U.S. PATENT DOCUMENTS

| | | |
|---|---|---|
| 2008/0317021 A1 | 12/2008 | Ives et al. |
| 2010/0171602 A1 | 7/2010 | Kabbara et al. |
| 2010/0205471 A1* | 8/2010 | Vavilala ................ G06F 1/3203 |
| | | 713/340 |
| 2013/0097710 A1* | 4/2013 | Basavapatna ........... H04W 4/02 |
| | | 726/25 |
| 2013/0139263 A1 | 5/2013 | Beyah et al. |
| 2014/0128066 A1* | 5/2014 | Sampath ............... H04W 48/14 |
| | | 455/435.1 |
| 2014/0185604 A1* | 7/2014 | Kil ....................... H04W 48/20 |
| | | 370/338 |
| 2016/0005044 A1* | 1/2016 | Moss ................. G06Q 20/4016 |
| | | 705/44 |
| 2016/0173511 A1* | 6/2016 | Bratspiess ............ H04L 41/145 |
| | | 726/23 |
| 2017/0013449 A1* | 1/2017 | Raman .................. H04W 12/06 |
| 2017/0134171 A1* | 5/2017 | Woxland ............... H04L 9/3263 |
| 2017/0180141 A1* | 6/2017 | Walden .................. H04L 41/28 |

\* cited by examiner

DEVICE IDENTIFICATION AND POLICY ENFORCEMENT USING POWER OVER ETHERNET (POE)

CROSS-REFERENCE TO RELATED APPLICATION

This application is related to and claims the benefit of U.S. Patent Application No. 62/271,068, filed Dec. 22, 2015 which is incorporated herein by reference in its entirety.

TECHNICAL FIELD

Aspects and implementations of the present disclosure relate to device identification and policy enforcement, and more specifically, to device identification and policy enforcement using Power over Ethernet (PoE).

BACKGROUND

Modern networks frequently manage connections from numerous devices such as computers, smartphones, access points, and other communication devices. Certain devices can connect to such networks via a Power over Ethernet ('PoE') connection. Such a PoE connection can enable the connected device to receive both data and electrical power via a single cable (e.g., an Ethernet cable). Examples of devices that utilize PoE connections include wireless access points, IP cameras, and VoIP phones. Various technologies monitor network activity in order to prevent unauthorized devices from accessing network resources. Recent developments in various industries such as the 'Internet of Things' (IoT) have resulted in increasing numbers of connected devices.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to device identification and policy enforcement using Power over Ethernet (PoE). The systems and methods disclosed can be employed with respect to network security, among other fields. More particularly, it can be appreciated that access to network resources by unauthorized devices is a significant and growing problem. At the same time, the proliferation of network-connected devices (e.g., smartphones, tablets, wearable devices, etc.) can make it difficult to effectively manage access to network resources for those users or devices that are authorized. Accordingly, described herein in various implementations are systems, methods, techniques, and related technologies, that enable the ongoing monitoring of network activity and provide the ability to control access to network resources (e.g., by defining and employing access policies which dictate the types of devices that are or are not authorized to access certain network resources, the circumstances under which such access is or is not permitted, etc.).

In order to effectively implement network access policies, it may be advantageous to identify, classify, or otherwise determine various aspects, features, or characteristics of those devices that are connected to a network or what such devices are (or are not) doing on the network. While it may be possible to determine certain types of identifying information (e.g., IP address, MAC address, etc.) with respect to many types of network-connected devices (e.g., those connected via a non-PoE Ethernet connection or Wi-Fi), in certain scenarios it may be difficult to conclusively determine certain characteristics of a particular device (e.g., whether such a device is an access point).

Accordingly, described herein in various implementations are systems, methods, techniques, and related technologies, that enable the identification of Power over Ethernet (PoE) enabled devices that are connected to a network. As described herein, communications from such PoE-connected devices can exhibit or reflect additional identifying information (e.g., beyond that which may be reflected by non-PoE devices) which can be used to employ more precise or effective access policies. Additionally, by virtue of the fact that the PoE-enabled device is receiving not only network access but also electrical power from the port to which it is connected, additional types of monitoring and enforcement can be employed, as described herein.

Accordingly, it can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

Figure 1:
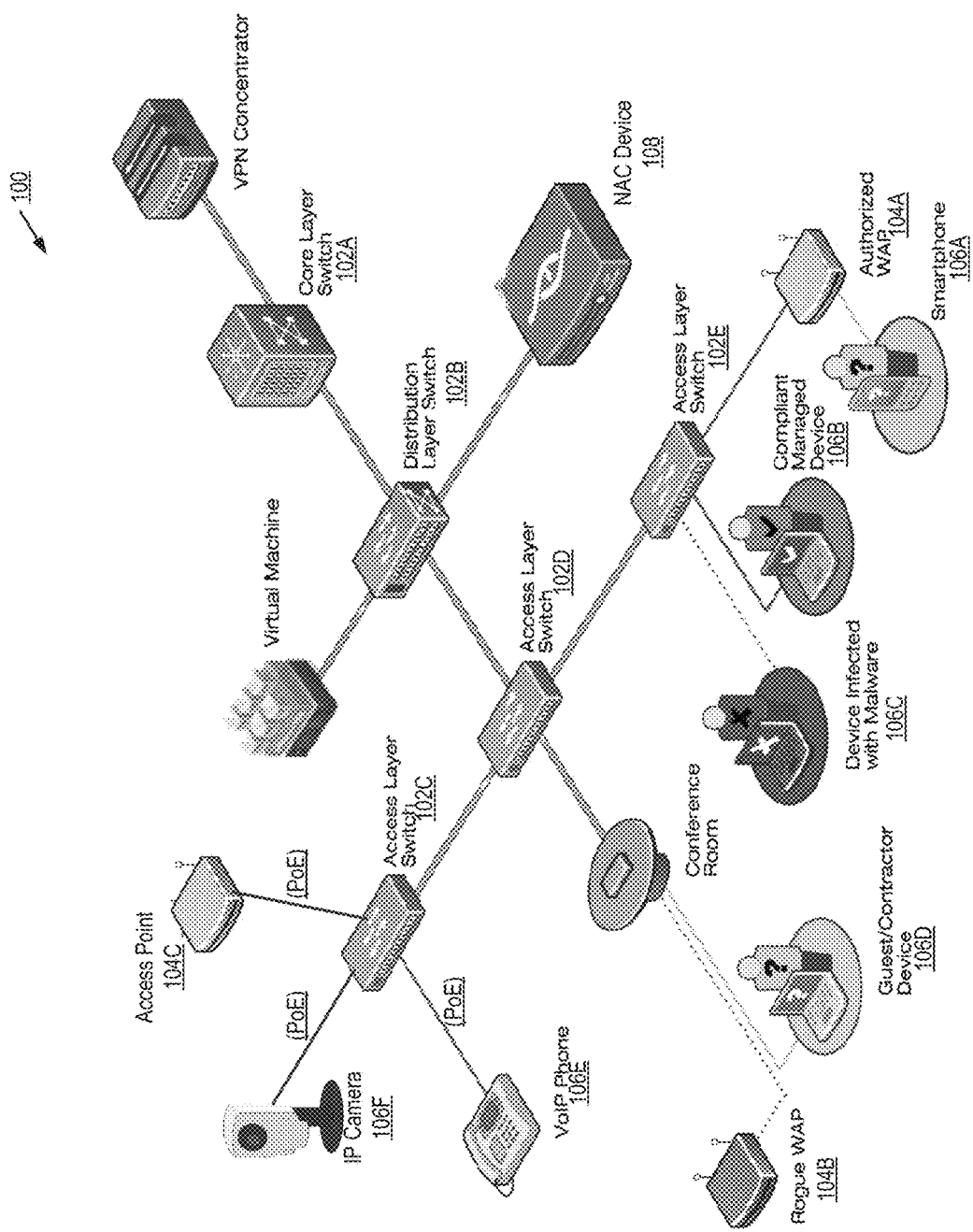
FIG. 1 depicts an illustrative system architecture in accordance with one implementation of the present disclosure.

FIG. 1 depicts an illustrative system architecture 100, in accordance with one implementation of the present disclosure. The system architecture 100 includes various devices including but not limited to various switches 102A-102E, access points 104A-104C, network devices 106A-106F, and a Network Access Control (NAC) device 108 (though it should be understood that, in certain implementations, multiple NAC devices may be implemented). The various elements or components depicted in FIG. 1 can be connected to one another via one or more networks, which can be, for example, a public network (e.g., the Internet), a private network (e.g., a local area network (LAN) or wide area network (WAN)), or a combination thereof. Further aspects of one or more of the various devices depicted in FIG. 1 are described below with respect to FIGS. 3 and 4.

Switches 102A-102E can be devices that can connect various computer devices or networks to one another, route network traffic, etc. Access points 104A-104C can be, for example, networking hardware devices such as wireless access points (WAPs) that allows wireless devices to connect to a wired network, such as using Wi-Fi (IEEE 802.11), or related standards. Network devices 106A-106F can be various electronic or computing devices that may connect to a network via one of the referenced access points or switches. Examples of such network devices include but are not limited to: a rackmount server, a router computer, a personal computer, a portable digital assistant, a mobile phone, a laptop computer, a tablet computer, a camera, a video camera, a netbook, a desktop computer, a media center, a network connected television, a VoIP device, any combination of the above, or any other such computing device capable of implementing the various features described herein. It should be understood that certain network devices may run an operating system (OS) that manages hardware and software of the network device.

NAC device 108 can be a rackmount server, a router computer, a personal computer, a portable digital assistant, a mobile phone, a laptop computer, a tablet computer, a camera, a video camera, a netbook, a desktop computer, a media center, a virtual implementation of any of the referenced devices, any combination of the above, or any other such computing device capable of implementing the various features described herein. NAC device 108 can be configured to detect the presence of various devices (including but not limited to those depicted in FIG. 1 and described herein), identify various connected devices, monitor network activity occurring between the various devices, or employ various access control policies with respect to the referenced devices or various resources (such as may be accessible via the network). It should be noted that in some implementations, various components of NAC device 108 may run on separate machines. Moreover, some operations of certain of the components are described in more detail below with respect to FIGS. 2A-2B.

As noted, in certain implementations NAC Device 108 can monitor network activity and enforce one or more network policies, such that, for example, certain network devices may be granted access to network resources (e.g., device 106B, which may be compliant with the referenced policies), while other devices may be denied such access (e.g., device 106C, which is infected with malware). Such devices may be identified, for example, based on their respective Internet Protocol (IP) addresses, media access control (MAC) addresses or the operating system (OS) that may be determined to be executing on the device. Additionally, in certain implementations NAC Device 108 can monitor network activity in order to identify access points (e.g., access points 104B) that are not authorized for use on the network, and may further enforce one or more network access policies with respect to such access points (e.g., by blocking network traffic to or from such access points). It should also be noted that NAC Device 108 may prompt certain devices (e.g., guest devices 106A and 106D) for further information prior to providing network access to such devices.

It can be appreciated that, as depicted in FIG. 1, in certain implementations various devices may connect to a switch (e.g., switch 102C) such that the connected device receives electrical power from the switch (in addition to data transmissions), such as using the Power over Ethernet (PoE) standard. Such a PoE connection can enable the connected device to receive both data and electrical power via a single cable (e.g., an Ethernet cable). In certain implementations, electrical power can be carried on the same conductors that transmit data, while in other implementations electrical power can be carried on dedicated conductors (e.g., within the same cable). Examples of network devices that may utilize PoE include Voice over IP (VoIP) phones, internet protocol (IP) cameras, and access points (e.g., wireless local area network (WLAN) access points), though it should be understood that many other types of devices can also utilize a PoE connection to enable power and data transmission via a single cable.

In addition to identifying a device based on its IP address, MAC address, or OS (such as is described above), additional identifying information can be determined with respect to devices that connect to a switch via PoE. For example, based on various aspects of Simple Network Management Protocol (SNMP) communications associated with a device (e.g., Management Information Bases (MIBs) or Object Identifiers (OIDs), NAC Device 108 can identify or determine the type of device that is connected to a particular port of a particular switch (e.g., switch 102C as depicted in FIG. 1) as well as the amount of power being consumed by the connected device (each of which may be reflected in respective MIBs associated with the device). For example, with respect to a VoIP phone connected to a switch via PoE, the phone may exhibit or reflect properties such as: 'Switch Port POE State: 12.3 mW' and 'Switch Port POE Device: Cisco 7945G IP Phone,' reflecting the power consumption of the device via the network port and the device description (e.g., model number) or type (e.g., VoIP phone), of the device. Additionally, it should be noted that, in certain implementations, a SNMP MIB that corresponds to the device type or model or name may have 'read or write' permissions. In such a scenario, the referenced MIB may be changed (e.g., to further identify a particular device, e.g., 'CEO Office Phone'). Accordingly, in order to effectively or accurately identify the connected device, it may be advantageous to utilize various naming conventions (e.g., by using a specific prefix that indicates the device model number) so that the properties of the device can be correctly determined.

It should be understood that the additional layer of identifying information that can be determined with respect to PoE-connected devices can enable the implementation of more precise, accurate, or effective access policies. For example, an access policy that restricts (or allows) a particular type of device (e.g., a certain VoIP phone model or IP camera type) can be employed when such devices are connected via PoE (because, as noted, additional identifying information, such as may reflect the device type can be determined). However, a comparable policy may not be as effectively employed with respect to devices that are not connected via PoE, as such devices may not be as readily identifiable.

As noted, having identified a device that is connected to a network via a network connection or port that supports PoE, various enforcement actions can be initiated. It should be understood that by virtue of the device being powered via the network port to which it is connected, additional enforcement approaches may be applied (which may not be available in non-PoE settings). For example, upon determining that an unauthorized device is connected to a switch via a network connection or port that supports PoE, an enforcement action can be initiated to block all activity or traffic (including electrical power) being provided via the port to which the unauthorized device is connected. In doing so, the device connected via a network connection or port that supports PoE (e.g., an IP camera) will shut down (as its power source has been disrupted). In contrast, while network access can be stopped for an unauthorized device connected to a switch via a network connection or port that does not provide PoE support, such enforcement actions may not be capable of actually shutting off (i.e., stopping power from being provided to) the unauthorized device. By way of illustration, in a scenario in which an access point is connected to the network via a network connection or port that supports PoE (and the access point is powered via such a port and not from an external power source), the described technologies can shut down or stop the power supply that such a port is providing to the access point via PoE, thereby blocking all network traffic to and from the access point. In contrast, in a scenario in which an access point is connected to the network but also receives power from an external (e.g., non-PoE) power supply, such an access point may not necessarily be capable of being shut down (e.g., via network-related commands or operations alone). Though various technologies may be capable of stopping network traffic between the switch and access point, the access point itself (which continues to receive power via the external power supply) will not be shut down. In such a scenario, wireless clients may be able to connect to or remain connected to the access point (though such an access point will not be capable of further communication with the network).

It should also be noted that it may be particularly advantageous to employ the described technologies in order to identify and prevent the use of unauthorized access points. For example, it may be difficult to identify such access points when they are connected to a network via a network connection or port that does not support PoE. However, in scenarios in which an unauthorized access point is connected to a network via a network connection or port that supports PoE, the described technologies can determine that an access point (as opposed to another type of device) has been connected, and various enforcement alerts, actions, etc., can be initiated (e.g., in order to shut down the unauthorized access point). It should be understood that the described techniques can be effective in scenarios in which the information provided or reflected by the referenced access point is accurate or consistent. However, in scenarios in which the referenced access point has been tampered with or 'hacked' in such a way that the information it provides or reflects is not accurate or consistent (e.g., the access point incorrectly indicates that it is another device, e.g., a VoIP phone), the described techniques may be less effective.

It should also be noted that, in certain implementations, various aspects of the power consumption activities of a PoE-powered device can be monitored. That is, in addition to the network usage of a device, as has been previously noted a device connected to a network connection or port that supports PoE can reflect the amount of power the device is consuming (e.g., from the network port to which it is connected). Accordingly, such power consumption can be monitored or various access policies can be employed with respect to such power consumption. For example, a particular type of device (e.g., IP camera) may be determined or expected to consume a certain amount of power, consume power in a certain pattern or at certain intervals (e.g., on weekdays), etc. Accordingly, upon determining that such a device is deviating from the referenced power-consumption pattern, etc., one or more actions can be initiated (e.g., alerting an administrator, blocking the port from sending or receiving network traffic, stopping power supplied to the device via PoE, etc.). For example, in scenarios in which electrical power is carried on the same conductors (within an Ethernet cable) as data transmissions, such conductors can be reconfigured or reset in a manner that prevents or precludes them from carrying power (e.g., to the referenced device). In scenarios in which electrical power is carried on dedicated conductors (e.g., conductors that are separate from those within the Ethernet cable that transmit data), such conductors (e.g., those dedicated to carrying power) can be deactivated in a manner that prevents or precludes them from carrying power (e.g., to the referenced device). Moreover, in certain implementations, even in a scenario in which it may not be possible to determine a device type of a PoE-connected device (e.g., in a scenario in which the device type or model number property of the device is inconclusive), it may be possible to determine the device type based on the power consumption pattern of the device (e.g., VoIP phones may consume power in accordance with one pattern, IP cameras in accordance with another power consumption pattern, etc.).

Figure 2A:
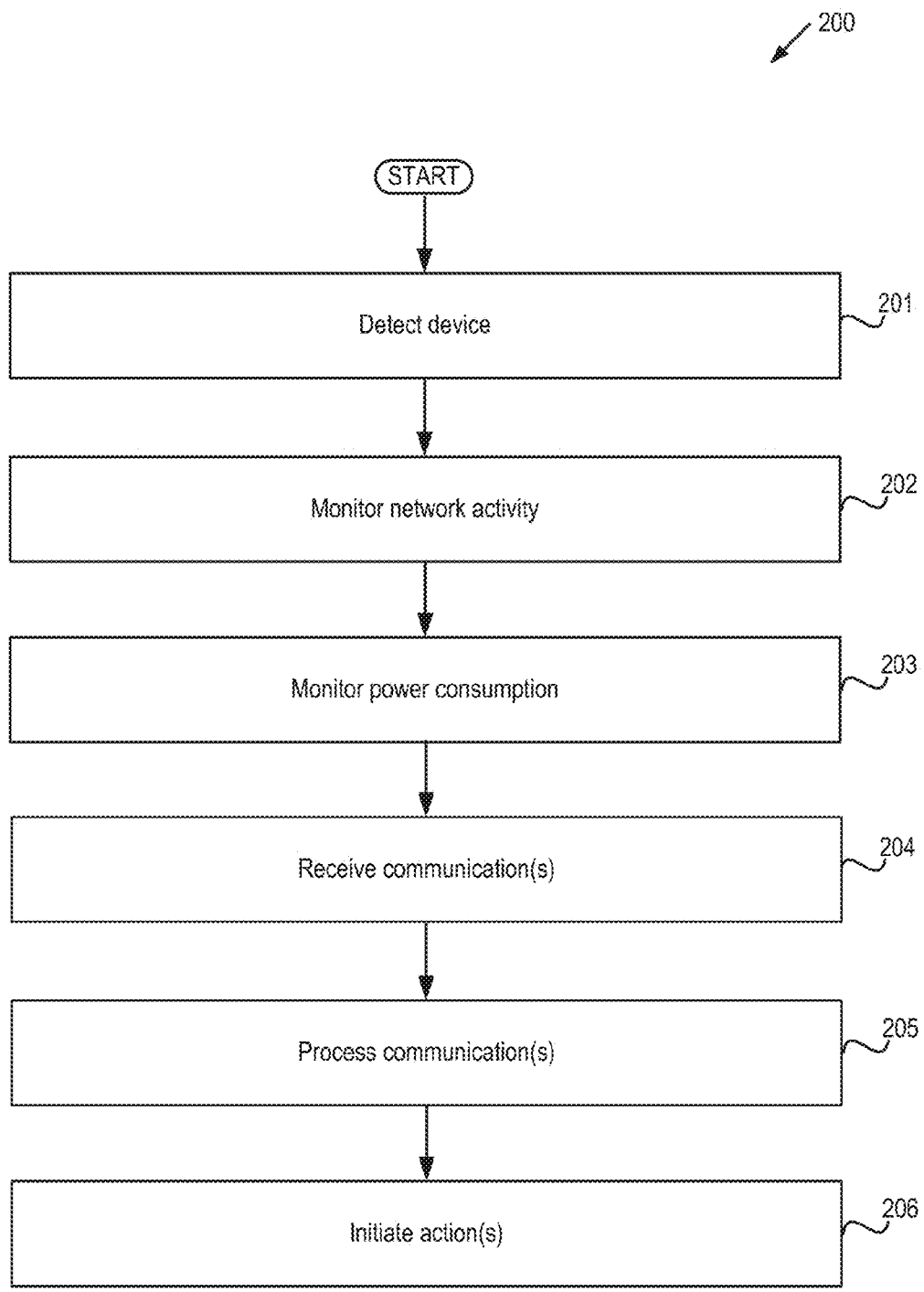
FIG. 2A depicts a flow diagram of aspects of a method for device identification and policy enforcement using Power over Ethernet (PoE) in accordance with one implementation of the present disclosure.
Figure 2B:
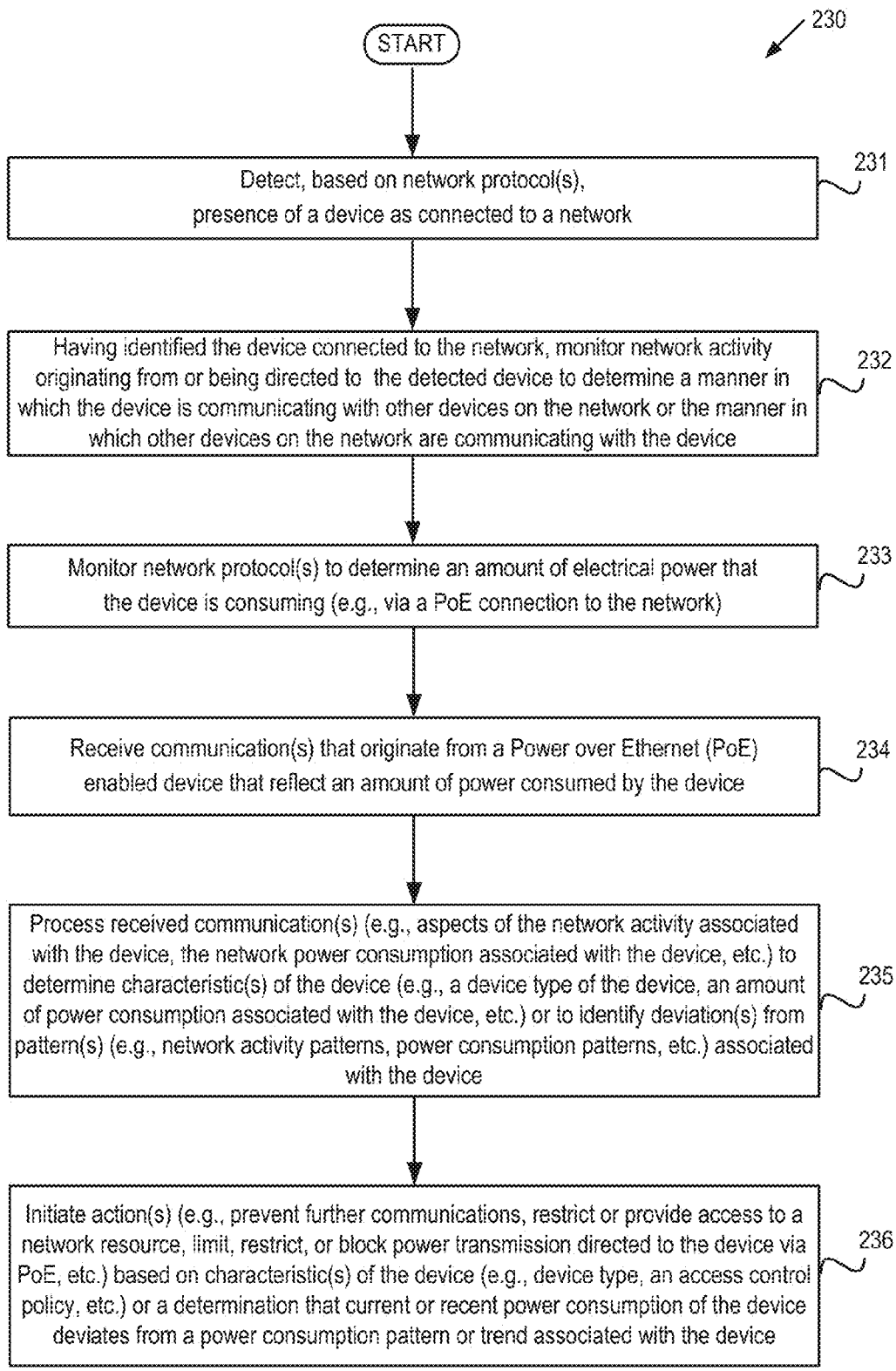
FIG. 2B depicts a flow diagram of further aspects of a method for device identification and policy enforcement using Power over Ethernet (PoE) in accordance with one implementation of the present disclosure.

FIGS. 2A and 2B depict flow diagrams of aspects of respective methods 200 and 230 for device identification and policy enforcement using Power over Ethernet (PoE). The methods are performed by processing logic that may comprise hardware (circuitry, dedicated logic, etc.), software (such as is run on a computing device such as those described herein), or a combination of both. In certain implementations, the methods can be performed by one or more elements depicted or described in relation to FIG. 1, 3, or 4 (e.g., by one or more processing devices, by NAC Device 108, etc.), while in some other implementations, one or more blocks of FIG. 2A or FIG. 2B may be performed by another machine or machines.

For simplicity of explanation, methods are depicted and described as a series of acts. However, acts in accordance with this disclosure can occur in various orders or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At block 201, a presence of a device can be detected, e.g., a presence of the device as connected to a network. In certain implementations, the presence of such a device may be detected when the device connects to the network. Moreover, in certain implementations (such as is depicted at block 231 of FIG. 2B) the presence of the device on the network may be detected based on various network protocols, including but not limited to SNMP, as described herein. It should also be noted that, as described herein, the referenced device can be, for example, an access point (e.g., access points 104A-104C as depicted in FIG. 1), a network device such as a computer, smartphone, VoIP phone, IP camera, etc. (e.g., network devices 106A-106F as depicted in FIG. 1), or any other such device capable of connection to a network. It should also be understood that, in certain implementations, various aspects of block 201 can be performed by one or more processing devices or by NAC Device 108, etc., while in other implementations such aspects may be performed by one or more other elements or components, such as those described herein.

At block 202 network activity associated with the device (e.g., the device detected at 201) can be monitored. For example, having identified a device connected to the network, network activity originating from or being directed to such a device can be monitored, tracked, etc. (e.g., via various network protocols, including but not limited to SNMP). In doing so, the manner in which the referenced device is communicating (e.g., with other devices on the network) or the manner in which other devices on the network are communicating with the referenced device can be determined (such as is depicted at block 232 of FIG. 2B). It should be understood that, in certain implementations, various aspects of block 202 can be performed by one or more processing devices or by NAC Device 108, etc., while in other implementations such aspects may be performed by one or more other elements or components, such as those described herein.

At block 203 the network power consumption associated with the device (e.g., the device detected at 201) can be monitored. For example, as described herein, various network protocols, including but not limited to SNMP (e.g., one or more MIBs associated with the device) can be monitored to determine the amount of electrical power that the device is consuming, e.g., via a PoE connection to the network (such as is depicted at block 233 of FIG. 2B). It should be understood that, in certain implementations, various aspects of block 203 can be performed by one or more processing devices or by NAC Device 108, etc., while in other implementations such aspects may be performed by one or more other elements or components, such as those described herein.

At block 204 one or more communications (e.g., SNMP communications), such as communications that originate from a Power over Ethernet (PoE) enabled device (e.g., the device detected at 201, such as IP camera 106F), can be received (e.g., by NAC Device 108 via one or more switches 102, such as is depicted in FIG. 1 and described herein). As described, in certain implementations such communications can include SNMP communications which may include MIBs that reflect, for example, an amount of power consumed by the device (such as is depicted at block 234 of FIG. 2B). It should be understood that, in certain implementations, various aspects of block 204 can be performed by one or more processing devices or by NAC Device 108, etc., while in other implementations such aspects may be performed by one or more other elements or components, such as those described herein.

At block 205, the received communications (e.g., those received from the device at 204) can be processed (e.g., by NAC Device 108). In doing so, various characteristics of the device can be determined, such as in a manner described herein. For example, in various implementations, aspects of the network activity associated with the device or the network power consumption associated with the device can be processed. In doing so, the referenced characteristics of the device can be determined (such as is depicted at block 235 of FIG. 2B). In certain implementations the referenced characteristics can include, for example, a device type of the device (e.g., an access point, IP camera, VoIP phone, etc.), an amount of power consumption associated with the device, etc. It should be understood that, in certain implementations, various aspects of block 205 can be performed by one or more processing devices or by NAC Device 108, etc., while in other implementations such aspects may be performed by one or more other elements or components, such as those described herein.

Moreover, in certain implementations the referenced communications, network activity, or aspects of the network power consumption associated with the device can be processed. In doing so, one or more deviation(s) from various patterns, such as network activity patterns, power consumption patterns, etc., associated with the device can be identified (such as is depicted at block 235 of FIG. 2B). That is, it can be appreciated that, in certain implementations, a particular device (or class of devices) can be determined, over time, to consume power (e.g., via PoE) in a certain manner, such as may be reflected in a pattern, trend, etc. Additionally, in certain implementations various policies (which can include, for example, various conditions, such as those that can be monitored, analyzed, or evaluated, at times repeatedly, against data obtained or received from the connected devices—for example, power consumption rates, patterns, or tendencies of various PoE-powered devices, such as are described herein) can be used to classify devices connected to the network. Thus, for example, when a device is detected (e.g., by NAC Device 108) as having been connected to the network, the referenced classification policy can be applied with respect to analyzing or evaluating the activity of the device in relation to the referenced conditions, e.g., in order to determine the type of device that was connected. Accordingly, upon identifying or determining (e.g., based on the referenced policies) that a particular connected device is associated with a certain device type, if subsequent network activity or other conditions indicate or reflect a discrepancy with respect to such an identification, this may indicate that an unauthorized or rogue device is connected to the network (and various actions can be initiated, e.g., with respect to the port(s) to which the referenced device is connected, as described herein). For example, a VoIP phone may consume relatively more power (via PoE) on work days (e.g., Monday-Friday) or during business hours (e.g., 9:00 am-5:00 pm). By way of further example, an IP camera (which is continuously recording) may constantly consume a steady quantity of power. By way of yet further example, an access point may consume power based on the network bandwidth passing through such an access point. Accordingly, having determined such a power consumption pattern associated with a device, subsequent communications received from the device (reflecting, for example, a current amount of power consumption) can be compared to such historical trends. To the extent that a device is operating in a manner that deviates (e.g., above a certain threshold, below a certain threshold, etc.) from one or more power consumption trends, this can indicate that the device may be malfunctioning, functioning in an unauthorized manner, etc. For example, a determination that an access point has started to consume considerably more power than it has tended to in the past, or that the access point is handling considerably more traffic than it has tended to in the past, can indicate that the manner in which such a device is operating may have changed (e.g., the access point is being used in an unauthorized manner to transfer considerable amounts of data to another device via the network).

At block 206, one or more actions can be initiated. In certain implementations, such actions can be initiated based on various characteristics of the device (e.g., those identified at 205). It should be understood that, in certain implementations, various aspects of block 206 can be performed by one or more processing devices or by NAC Device 108, etc., while in other implementations such aspects may be performed by one or more other elements or components, such as those described herein.

For example, in certain implementations such action(s) can be initiated based on a determination that the current (or recent) power consumption of the device deviates from a power consumption pattern or trend associated with the device (e.g., as described above). By way of further example, in certain implementations such action(s) can be initiated based on a determination that the current (or recent)

network activity of the device deviates from a network activity pattern or trend associated with the device. In doing so, in scenarios in which the manner in which the device currently operates may indicate or reflect that the device is no longer operating in the manner in which it had previously observed to have operated, various actions can be initiated (such as are described herein). In doing so, further activity (e.g., further unauthorized activity) can be prevented (such as is depicted at block 236 of FIG. 2B).

Moreover, in certain implementations various actions may be initiated based on an amount or quantity of power being consumed by the device. For example, in certain implementations a certain amount of power consumption (e.g., above or below a certain threshold) may reflect activity that may be unauthorized (e.g., in certain network contexts or settings). For example, in certain implementations a particular network may be primarily or solely dedicated to use of VoIP devices (which may, for example, consume a relatively small amount of power via their respective PoE connections to the network). Accordingly, upon determining that a device connected to the network is consuming relatively more power (which may be consistent, for example, with an access point or IP camera), it can be determined that the connection of such a device to the referenced network is likely unauthorized. Based on such a determination, various actions can be initiated (such as are described herein), such as in order to prevent further activity.

Additionally, in certain implementations various actions can be initiated based on the device type of the device or an access control policy associated with the network or the device. For example, as noted above, an access control policy can dictate that a particular network may be primarily or solely dedicated to the use of certain types of devices (e.g., VoIP devices). By way of further example, an access control policy can dictated that certain types of devices (e.g., access points) may be unauthorized on a particular network. Accordingly, upon determining that a particular device (e.g., a particular type or class of device) has been connected to the network (such as in a manner described herein), it can be further determined whether the connection of such a device to the referenced network is authorized or unauthorized, and various actions (such as are described herein) can be initiated (e.g., in order to prevent unauthorized activity).

It should be understood that any number of actions can be initiated, e.g., based on a determination that a certain device is connected to the network, based on a determination that a device is operating in a certain manner, etc. For example, access to a network resource can be restricted, e.g., with respect to the detected device. That is, upon determining that a device is (or is likely to be) connected to the network in an unauthorized manner, access to a particular network resource (e.g., another device connected to the network, e.g., a database containing sensitive information) can be restricted or blocked with respect to the unauthorized device. By way of further example, upon determining that a device is connected to the network in an unauthorized manner, access to a particular network resource (e.g., another device connected to the network, e.g., a database containing sensitive information) can be restricted or blocked with respect to some or all devices on the network.

By way of yet further example, in certain implementations the described technologies can also be used to provide the device with access to certain network resources. For example, upon determining that a certain device (e.g., a VoIP phone) is connected to the network, access to a particular network resource (e.g., a telephone directory of an organization) can be provided to the connected device. In contrast, upon determining that another type of device (e.g., an IP camera) is connected to the network, access to the referenced network resource (here, the referenced telephone directory) may not be provided.

Additionally, in certain implementations, upon determining that a device is (or is likely to be) connected to the network in an unauthorized manner, network traffic originating from or directed to the device can be restricted or blocked. Moreover, in certain implementations power transmission directed to the device via a network connection (e.g., via PoE) can be restricted or blocked. In doing so, the described technologies can, for example, shut off or power down an unauthorized connected device (e.g., by stopping the network port to which the device is connected from providing power.

It should also be noted that while the described techniques and technologies are described herein primarily with respect to device identification and policy enforcement using Power over Ethernet (PoE), the described techniques or technologies are not so limited. Accordingly, it should be understood that the described techniques or technologies can be similarly implemented or employed in other settings and contexts. By way of illustration, in certain implementations the described technologies can be employed with respect to various other types of connected devices, such as may be present in various 'Internet of Things' ('IoT') implementations. For example, various embedded devices, sensors, can be monitored, controlled, etc., using the described technologies. As described, access policies can reflect the degree to which such devices may (or may not) access network resources.

It should also be understood that the components referenced herein can be combined together or separated into further components, according to a particular implementation. Additionally, in some implementations, various components of a particular device may run on separate machines.

Figure 3:
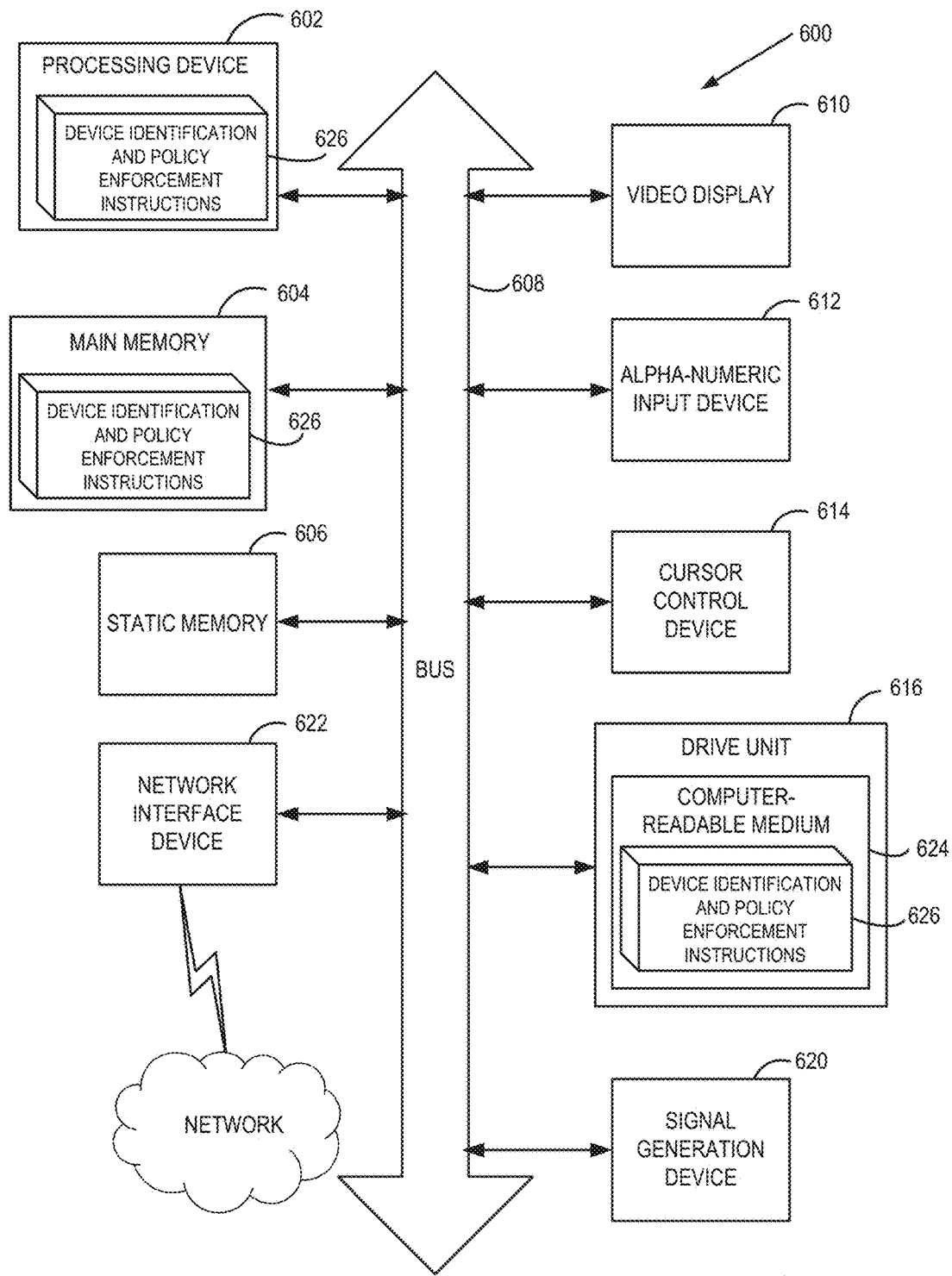
FIG. 3 depicts a block diagram of an illustrative computer system operating in accordance with aspects and implementations of the present disclosure.
Figure 4:
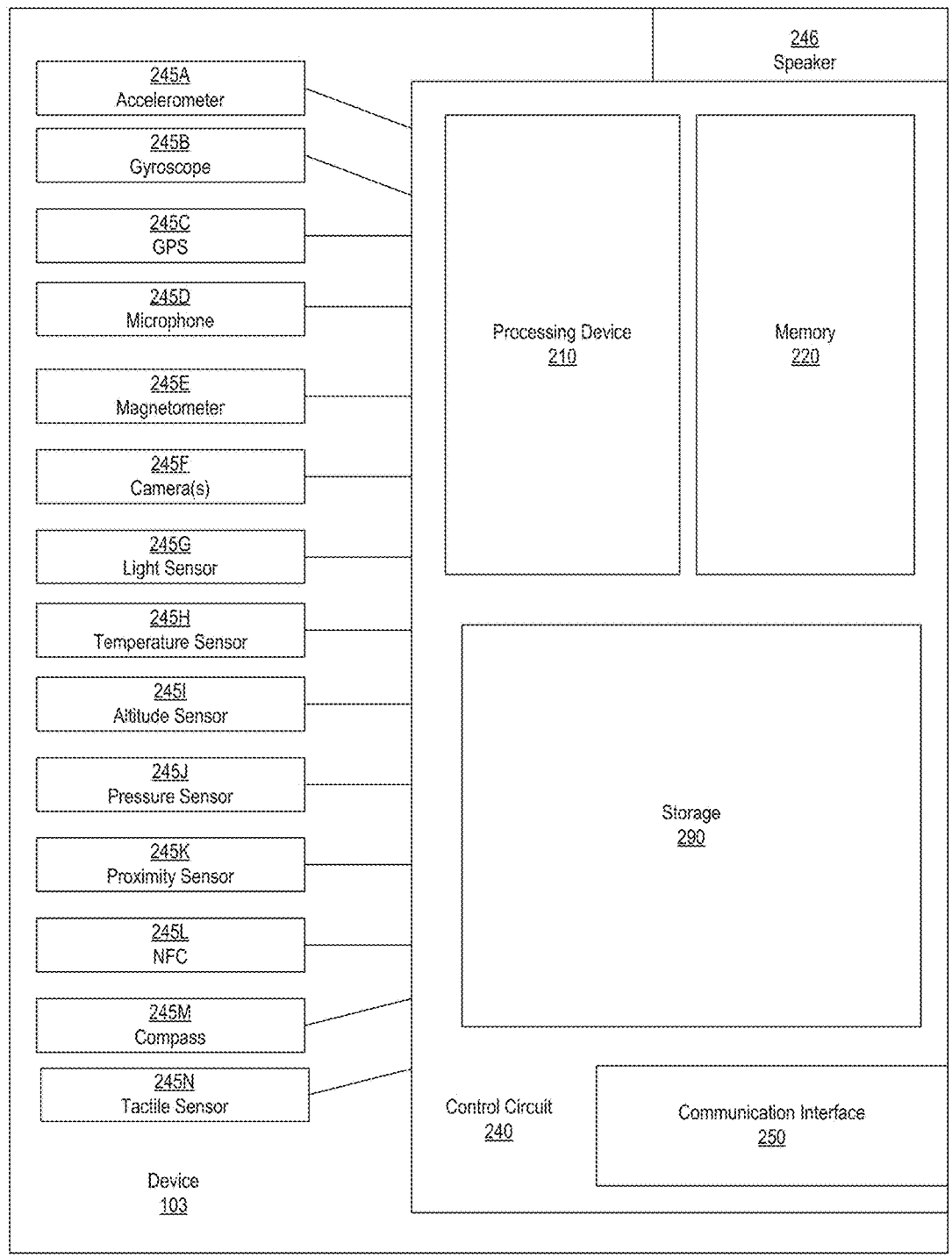
FIG. 4 depicts an exemplary implementation of a device in accordance with aspects and implementations of the present disclosure.

FIG. 3 depicts an illustrative computer system within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), smart camera, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. It should also be noted that various further aspects of the referenced computer system in accordance with certain implementations are also depicted in FIG. 4 and described below.

The exemplary computer system 600 includes a processing device 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 616, which communicate with each other via a bus 608.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The data storage device 616 may include a computer-readable medium 624 on which is stored one or more sets of device identification and policy enforcement instructions 626 embodying any one or more of the methodologies or functions described herein. Instructions 626 may also reside, completely or at least partially, within the main memory 604 or within the processing device 602 during execution thereof by the computer system 600, the main memory 604 and the processing device 602 also constituting computer-readable media. Instructions 626 may further be transmitted or received over a network via the network interface device 622.

While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

FIG. 4 depicts further aspects of a computing device 103 that can be configured to implement one or more of the technologies or techniques described herein. Device 103 can be a rackmount server, a router computer, a personal computer, a portable digital assistant, a mobile phone, a laptop computer, a tablet computer, a camera, a video camera, a netbook, a desktop computer, a media center, a smartphone, a watch, a smartwatch, an in-vehicle computer or system, any combination of the above, or any other such computing device capable of implementing the various features described herein. Various applications, such as mobile applications ('apps'), web browsers, etc. (not shown) may run on the user device (e.g., on the operating system of the user device). It should be understood that, in certain implementations, user device 103 can also include or incorporate various sensors or communications interfaces. Examples of such sensors include but are not limited to: accelerometer, gyroscope, compass, GPS, haptic sensors (e.g., touchscreen, buttons, etc.), microphone, camera, etc. Examples of such communication interfaces include but are not limited to cellular (e.g., 3G, 4G, etc.) interface(s), Bluetooth interface, Wi-Fi interface, USB interface, NFC interface, etc.

As noted, in certain implementations, user device(s) 103 can also include or incorporate various sensors or communications interfaces. By way of illustration, FIG. 4 depicts one exemplary implementation of user device 103. As shown in FIG. 4, device 103 can include a control circuit 240 (e.g., a motherboard) which is operatively connected to various hardware or software components that serve to enable various operations, such as those described herein. Control circuit 240 can be operatively connected to processing device 210 and memory 220. Processing device 210 serves to execute instructions for software that can be loaded into memory 220. Processing device 210 can be a number of processors, a multi-processor core, or some other type of processing device, depending on the particular implementation. Further, processing device 210 can be implemented using a number of heterogeneous processor systems in which a main processor is present with secondary processors on a single chip. As another illustrative example, processing device 210 can be a symmetric multi-processor system containing multiple processing devices of the same type.

Memory 220 and storage 290 may be accessible by processing device 210, thereby enabling processing device 210 to receive and execute instructions stored on memory 220 and on storage 290. Memory 220 can be, for example, a random access memory (RAM) or any other suitable volatile or non-volatile computer readable storage medium. In addition, memory 220 can be fixed or removable. Storage 290 can take various forms, depending on the particular implementation. For example, storage 290 can contain one or more components or devices. For example, storage 290 can be a hard drive, a flash memory, a rewritable optical disk, a rewritable magnetic tape, or some combination of the above. Storage 290 also can be fixed or removable.

A communication interface 250 is also operatively connected to control circuit 240. Communication interface 250 can be any interface (or multiple interfaces) that enables communication between user device 103 and one or more external devices, machines, services, systems, or elements. Communication interface 250 can include (but is not limited to) a modem, a Network Interface Card (NIC), an integrated network interface, a radio frequency transmitter or receiver (e.g., Wi-Fi, Bluetooth, cellular, NFC), a satellite communication transmitter or receiver, an infrared port, a USB connection, or any other such interfaces for connecting device 103 to other computing devices, systems, services, or communication networks such as the Internet. Such connections can include a wired connection or a wireless connection (e.g. 802.11) though it should be understood that communication interface 250 can be practically any interface that enables communication to or from the control circuit 240 or the various components described herein.

At various points during the operation of described technologies, device 103 can communicate with one or more other devices, systems, services, servers, etc., such as those depicted in the accompanying figures and described herein. Such devices, systems, services, servers, etc., can transmit and receive data to or from the user device 103, thereby enhancing the operation of the described technologies, such as is described in detail herein. It should be understood that the referenced devices, systems, services, servers, etc., can be in direct communication with user device 103, indirect communication with user device 103, constant or ongoing communication with user device 103, periodic communication with user device 103, or can be communicatively coordinated with user device 103, as described herein.

Also preferably connected to or in communication with control circuit 240 of user device 103 are one or more sensors 245A-245N (collectively, sensors 245). Sensors 245 can be various components, devices, or receivers that can be incorporated or integrated within or in communication with user device 103. Sensors 245 can be configured to detect one or more stimuli, phenomena, or any other such inputs, described herein. Examples of such sensors 245 include, but are not limited to, an accelerometer 245A, a gyroscope 245B, a GPS receiver 245C, a microphone 245D, a magnetometer 245E, a camera 245F, a light sensor 245G, a temperature sensor 245H, an altitude sensor 245I, a pressure sensor 245J, a proximity sensor 245K, a near-field communication (NFC) device 245L, a compass 245M, and a tactile sensor 245N. As described herein, device 103 can perceive or receive various inputs from sensors 245 and such inputs can be used to initiate, enable, or enhance various operations or aspects thereof, such as is described herein.

At this juncture it should be noted that while the foregoing description (e.g., with respect to sensors 245) has been directed to user device 103, various other devices, systems, servers, services, etc. (such as are depicted in the accompanying figures and described herein) can similarly incorporate the components, elements, or capabilities described with respect to user device 103. For example, various devices depicted as part of system architecture 100 may also incorporate one or more of the referenced components, elements, or capabilities.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "processing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Aspects and implementations of the disclosure also relate to an apparatus for performing the operations herein. This apparatus may be specially constructed for the required purposes. A corresponding computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It should be understood that the present disclosure is not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. Moreover, the techniques described above could be applied to other types of data instead of, or in addition to those referenced herein. The scope of the disclosure should, therefore, be determined with reference to the appended claims, along with the full scope of equivalents to which such claims are entitled.

What is claimed is:

1. A method comprising:
   detecting, based on a network protocol, the presence of a Power over Ethernet (PoE) enabled device connected to a network;
   monitoring network activity originating from or being directed to the PoE enabled device to determine how the device is communicating with other devices on the network;
   monitoring a network protocol to determine an amount of electrical power that the PoE enabled device is consuming;
   receiving a communication that originates from the Power over Ethernet (PoE) enabled device that reflects an amount of power consumed by the PoE device;
   processing, by a processing device, the amount of power consumption consumed with the PoE enabled device to identify a deviation from a power consumption pattern associated with the PoE enabled device; and
   blocking power transmission directed to the PoE enabled device via a network connection based on the deviation from the power consumption pattern associated with the PoE enabled device.

2. The method of claim 1, further comprising monitoring network activity associated with the PoE enabled device.

3. The method of claim 1, wherein processing the communication further comprises processing the network activity associated with the PoE enabled device to determine the one or more characteristics of the PoE enabled device.

4. The method of claim 1, wherein the communication comprises a Simple Network Management Protocol (SNMP) communication.

5. A system comprising:
   a memory; and
   a processing device, operatively coupled to the memory, to:
     detect, based on a network protocol, the presence of a Power over Ethernet (PoE) enabled device connected to a network;
     monitor network activity originating from or being directed to the PoE enabled device to determine how the device is communicating with other devices on the network;

monitor a network protocol to determine an amount of electrical power that the PoE enabled device is consuming;
receive a communication that originates from the Power over Ethernet (PoE) enabled device that reflects an amount of power consumed by the PoE device;
process the amount of power consumption consumed with the PoE enabled device to identify a deviation from a power consumption pattern associated with the PoE enabled device; and
block power transmission directed to the PoE enabled device via a network connection based on the deviation from the power consumption pattern associated with the PoE enabled device.

6. The system of claim 5, wherein the processing device is further to initiate an action based on the deviation from the power consumption pattern associated with the POE enabled device and the characteristic of the PoE enabled device.

7. A non-transitory computer readable medium having instructions encoded thereon that, when executed by a processing device, cause the processing device to:
detect, based on a network protocol, the presence of a Power over Ethernet (PoE) enabled device connected to a network;
monitor network activity originating from or being directed to the PoE enabled device to determine how the device is communicating with other devices on the network;
monitor a network protocol to determine an amount of electrical power that the PoE enabled device is consuming;
receive a communication that originates from the Power over Ethernet (PoE) enabled device that reflects an amount of power consumed by the PoE device;
process the amount of power consumption consumed with the PoE enabled device to identify a deviation from a power consumption pattern associated with the PoE enabled device; and
block network traffic directed to the PoE enabled device based on the characteristic and the amount of power consumed by the PoE enabled device.

8. The non-transitory computer readable medium of claim 7, wherein to process the communication, the processing device is further to initiate the action based on the characteristic, the amount of power consumed by the PoE enabled device, and the deviation from the power consumption pattern associated with the PoE enabled device.

* * * * *